(12) United States Patent
Nilsson

(10) Patent No.: US 9,934,421 B1
(45) Date of Patent: Apr. 3, 2018

(54) OPTICAL SPOOF DETECTION

(71) Applicant: Fingerprint Cards AB, Göteborg (SE)

(72) Inventor: René Nilsson, Eslöv (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/707,118

(22) Filed: Sep. 18, 2017

(30) Foreign Application Priority Data

Nov. 23, 2016  (SE) .................................... 1651526-4

(51) Int. Cl.
*G06K 9/00* (2006.01)
*G07C 9/00* (2006.01)

(52) U.S. Cl.
CPC ......... *G06K 9/0012* (2013.01); *G06K 9/0002* (2013.01); *G06K 9/00899* (2013.01); *G07C 9/00087* (2013.01); *G07C 9/00158* (2013.01)

(58) Field of Classification Search
None
See application file for complete search history.

(56) References Cited

U.S. PATENT DOCUMENTS

| 6,327,376 | B1 | 12/2001 | Harkin |
| 2009/0166411 | A1 | 7/2009 | Kramer et al. |
| 2010/0315337 | A1 | 12/2010 | Ferren et al. |
| 2016/0132712 | A1* | 5/2016 | Yang ..................... G06K 9/0002 348/77 |
| 2016/0148036 | A1 | 5/2016 | Kim et al. |
| 2016/0180146 | A1 | 6/2016 | Setterberg et al. |
| 2017/0124370 | A1* | 5/2017 | He ......................... G06K 9/0012 |
| 2017/0243049 | A1* | 8/2017 | Dong .................. G06K 9/00053 |
| 2017/0300682 | A1* | 10/2017 | Alten ...................... G06F 21/32 |

OTHER PUBLICATIONS

Marcialis, Gian Luca, and Fabio Roli. "Fingerprint verification by fusion of optical and capacitive sensors." Pattern Recognition Letters 25.11 (2004): 1315-1322.*
Swedish Search Report from Swedish Application No. 1651526-4, dated Jul. 18, 2017.

* cited by examiner

*Primary Examiner* — Sean Conner
(74) *Attorney, Agent, or Firm* — RMCK Law Group PLC

(57) ABSTRACT

The present invention generally relates to authenticating a user of an electronic device comprising a capacitive fingerprint sensor and an optical sensor arranged side-by-side with the capacitive fingerprint sensor. In accordance with the present invention a first image of at least a first portion of an object is acquired using the capacitive fingerprint sensor and an optical image of at least a second portion of the object is acquired using the optical sensor, the optical image and the first image being representative of neighboring portions of the object. An edge portion of the first image is matched with at least an edge portion of the optical image, where the edge portions represent the object at the border between the capacitive fingerprint sensor and the optical sensor. When there is a match, a fingerprint authentication procedure may be performed.

22 Claims, 11 Drawing Sheets

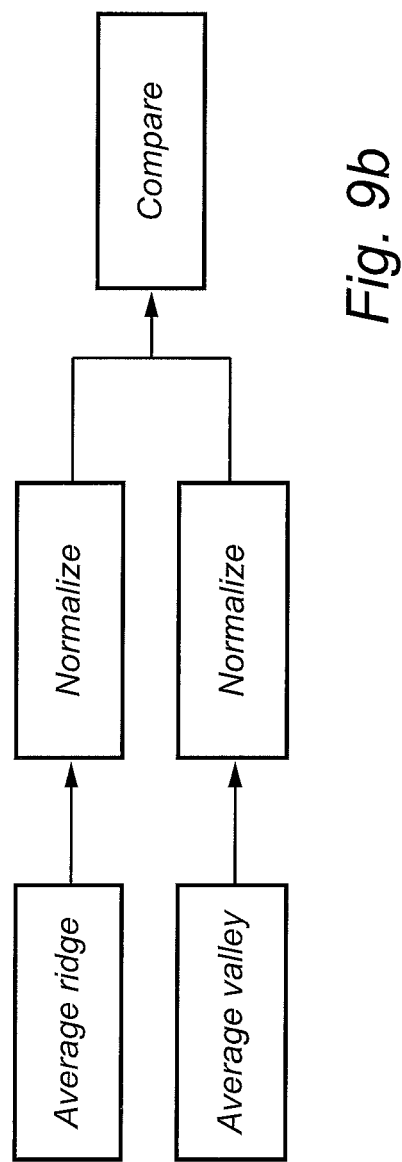

OPTICAL SPOOF DETECTION

CROSS-REFERENCE TO RELATED APPLICATION

The present application is based on and claims the benefit of Swedish patent application Serial No. 1651526-4 filed Nov. 23, 2016, the content of which is hereby incorporated by reference in its entirety.

TECHNICAL FIELD

The present invention generally relates to a method for authenticating a user of an electronic device comprising a capacitive fingerprint sensor and an optical sensor. The present invention further generally relates to a corresponding fingerprint sensor system and electronic device.

BACKGROUND OF THE INVENTION

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

All capacitive fingerprint sensors provide an indicative measure of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially.

One of the problems associated with fingerprint sensors concerns so-called spoof fingers trying to mimic a live fingerprint to thereby deceive a fingerprint sensor. If fraud by the spoof finger is successful, unauthorized access to systems may undesirably be approved or unauthorized transactions may be approved which may lead to disastrous consequences. Furthermore, a spoof finger is relatively easy to produce which may eventually lead to an increasing number of fraud attempts, in particular as fingerprint sensors become more and more common as a means for authentication.

Therefore, there is a need for improvement with regards to increasing the level of security with regard to authentication with fingerprint sensors.

SUMMARY OF THE INVENTION

In view of above-mentioned and other drawbacks of the prior art, it is an object of the present invention to provide a fingerprint sensor with improved authentication security. It is a further an object to provide a corresponding method to be implemented in a fingerprint sensor system.

According to an aspect of the present invention, it is therefore provided a method for authenticating a user of an electronic device comprising: a capacitive fingerprint sensor comprising an array of sensing elements for sensing a fingerprint pattern each sensing element having a sensing structure arranged in a sensing structure plane, the capacitive fingerprint sensor being configured to obtain a capacitive image of a first portion of a user's finger, and an optical sensor arranged side-by-side with the capacitive fingerprint sensor, the optical sensor comprising an array of optical sensor units arranged adjacent to the array of sensing structures in the sensing structure plane, the optical sensor being configured to obtain an optical image of a second portion of the user's finger, the second portion and the first portion being neighboring portions, wherein the method comprising the steps of: acquiring, using the capacitive fingerprint sensor, a first image of at least a first portion of an object; acquiring, using the optical sensor, an optical image of at least a second portion of the object, the optical image and the first image being representative of neighboring portions of the object; matching an edge portion of the first image with at least an edge portion of the optical image, the edge portion of the first image and the edge portion of the optical image representing the object at the border between the capacitive fingerprint sensor and the optical sensor, wherein when there is a match, performing a fingerprint authentication procedure based on at least one of the first image and the optical image, and a plurality of fingerprint enrolment templates.

The present invention is based upon the realization that matching of images for spoof detection does not require images representing overlapping regions of the object (e.g. a spoof finger). Instead, the edges of a capacitive image and an optical image are matched which enables a simpler fingerprint sensing system without compromising security aspect for authentication. Accordingly, the improvement in authentication security is achieved by placing a capacitive fingerprint sensor side-by-side with an optical sensor for enabling the matching of the edges portions of an obtained capacitive first image with an optical image being optically acquired. In other words, the first image is a capacitive image. It is further realized that the capacitive fingerprint sensor and the optical sensor may obtain images at different depths into the spoof or finger. Depending on the optical properties and electrical properties of the spoof and/or finger, the capacitive sensor may sense deeper structures than the optical sensor, or the optical sensor may sense deeper structures that the capacitive sensor.

Performing a fingerprint authentication procedure includes determining a verification representation of at least one of the first image and the optical image. The verification representation is matched with stored enrolment representations of a user. The enrolment representations are determined from enrolment images acquired with the fingerprint sensor. In addition, the optical image may also be used for enrolment and verification together with the first image. Thus, for fingerprint authentication, a verification representation of the optical image may be compared with a stored enrolment representation formed based on an optical enrolment image of the fingerprint.

In the context of the present application, the "enrolment representation" and/or the "verification representation" of a fingerprint image may be any information extracted from the fingerprint image, which is useful for assessing the similarity between fingerprint images acquired at different times. For instance, the enrolment/verification representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized. Various ways of extracting such verification representation or enrolment representation from a fingerprint image are well-known to a person of ordinary skill in the relevant art.

The optical sensor units may for example be an array of photo diodes configured to sense a light signal striking the optical sensor area of the respective photo diode.

The optical sensor and the capacitive fingerprint sensor are arranged adjacent each other which enables a compact sensor structure. In particular, the optical sensor and the capacitive fingerprint sensor are arranged with optical sensor units and capacitive sensing elements adjacent to each other. For example, at least a portion of the sensing structures in the array of sensing elements has neighboring optical sensor units such that images of neighboring portions of an object can be acquired by the optical sensor units and the neighboring sensing elements. The first image and the optical image are advantageously acquired at least nearly simultaneously.

The matching of an edge portion of the first image with at least an edge portion of the optical image comprises matching of features in the images, or matching of features derivable from the images or derivable from signals from the capacitive fingerprint sensor and the optical sensor.

According to one embodiment of the invention, the optical sensor may acquire a set of optical images comprising at least a first optical image acquired at a first wavelength range and a second optical image acquired at a second wavelength range different from the first wavelength range; wherein the step of matching of the edge portion of the first image with at least an edge portion of the optical image comprises: matching the edge portion of the first image with an edge portion of each of the optical images in the set of optical images. In other words, optical images are acquired at more than one wavelength. The matching of edge portions are performed for each of the wavelength ranges. This advantageously takes into account different optical properties of spoof materials which may not be characteristic for live fingers. For example, absorption and reflection characteristic of spoof materials may differ from those of live fingers. Thereby, enhanced authentication security is achieved. Acquiring images at different wavelengths may be performed by filtering methods or illumination methods known in the art, for example by reflection or absorption spectroscopy based methods.

The wavelength of the different wavelength ranges may be any wavelength in the range between 380 nm to 1100 nm. For example, the different wavelength ranges may be in the range 380 nm to 420 nm, or in the range 780 nm to 950 nm, such as about 400 nm, or about 940 nm, or about 780 nm. Of course deviations from the specified wavelengths are allowed, and each specified wavelength may have an error margin of about 10% (e.g. 400 nm±20 nm). The wavelength range is generally limited by the spectral properties of the skin of the human finger, or by the optical limitations set by the optical sensor itself.

The optical images in the set of optical images may advantageously be normalized with respect to one of the optical images in the set of optical images. For example, output signal values (e.g. "pixel values") from sensing units of the optical sensor may be normalized with respect to output signal values representative of one of the optical images.

According to embodiments of the invention, the method may further comprise: determining a fingerprint feature location in the edge portion of the first image; based on the fingerprint feature location, determining the expected feature location of the fingerprint feature in the optical images of the set of optical images; comparing representations of the fingerprint feature at the expected feature location in the optical images to each other, the representations being formed from the optical images acquired at different wavelengths, wherein based on the comparison determine that there is a match, whereby a fingerprint authentication procedure may be performed. In other words, the fingerprint features located in the first image may be used to determine an expected location of the fingerprint feature in the optical images acquired at different wavelengths. By comparing the fingerprint feature at the expected location in the optical images to each other, it can be determined from a difference in the optical images whether a spoof is present or not. For example, the optical properties of the spoof material may differ from those of a live finger, whereby differences in the optical images at different wavelengths may be used for establishing the presence of a spoof.

According to one embodiment, there may be included: determining a set of ridge locations and a set of valley locations in the edge portion of the first image; based on the ridge and valley positions in the first image, determining a set of expected ridge locations and a set of expected valley locations in each of the optical images acquired at different wavelengths; based on output signal levels at the expected ridge locations and expected valley locations in the optical images, for each optical image acquired at different wavelengths: determining an average ridge signal level for the set of expected ridge locations in the optical image, and determining an average valley signal level for the set of expected valley locations in the optical image; calculating a normalized average ridge signal level, the normalization being with respect to one of the determined average ridge signals at one of the wavelengths, calculating a normalized average valley signal level, the normalization being with respect to the one of the determined average valley signals at the one of the wavelengths, for each of the different wavelengths, compare the normalized average ridge signal level to the normalized average valley signal level, wherein based on the comparison, determining that there is a match between the edge portion of the first image and the edge portion of each of the optical images. Determining the expected locations may be performed by matching a line of sensing structures (e.g. "pixels") with a line of optical sensing units by crossing over from the capacitive finger sensor to the optical sensor orthogonally to the border, or in some implementations at an angle not being orthogonal in case the ridge on the capacitive side is followed across the border. E.g. line 5 of pixels has a ridge, the line 5 (or the corresponding line of optical sensing units if the number of sensing units is not the same as the number of sensing structures of the capacitive sensor) of the optical sensor is expected to represent a ridge. The comparison of the normalized average ridge signal level with the normalized average valley signal level may comprise a difference between the signals, a ratio between the signals, addition of the signals, etc. However, for the determining that there is a match between the edge portion of the first image and the edge portion of each of the optical images the comparison should agree for each of the images at different wavelengths, i.e. the difference should be the same, or any of the other types of comparisons. A "ridge" and a "valley" are known fingerprint features to the skilled person.

In another embodiment, there may be included the steps of: determining a set of valley locations in the edge portion of the first image, based on the valley location in the first image, determining a set of expected valley locations in the optical images acquired at different wavelengths, based on output signal levels at the expected valley locations in the optical images, for each optical image acquired at different wavelengths: determining a first average valley signal level for a first subset of the set of expected valley locations in the optical image, determining a second average valley signal level for a second subset of the set of expected valley locations in the optical image, and calculating a first normalized average valley signal level for the first average valley signal, the normalization being with respect to the respective one of the determined average valley signals at one of the wavelengths, calculating a second normalized average valley signal level for the second average valley signal, the normalization being with respect to the respective one of the determined average valley signals at the one of the wavelengths for each of the different wavelengths, comparing the first normalized valley ridge signal level to the second normalized average valley signal level, wherein based on the comparison, determining that there is a match between the edge portion of the first image and the edge portion of each of the optical images.

According to one embodiment, there may be included the steps of: determining a set of ridge locations in the edge portion of the first image; based on the ridge location in the first image, determining a set of expected ridge locations in the optical images acquired at different wavelengths; based on output signal levels at the expected ridge locations in the optical images, for each optical image acquired at different wavelengths: determining a first average ridge signal level for a first subset of the set of expected ridge locations in the optical image, determining a second average ridge signal level for a second subset of the set of expected ridge locations in the optical image; and calculating a first normalized average ridge signal level for the first average ridge signal, the normalization being with respect to the respective one of the determined average ridge signals at one of the wavelengths, and calculating a second normalized average ridge signal level for the second average ridge signal, the normalization being with respect to the respective one of the determined average ridge signals at the one of the wavelengths; for each of the different wavelengths, comparing the first normalized ridge signal level to the second normalized average ridge signal level, wherein based on the comparison, determining that there is a match between the edge portion of the first image and the edge portion of each of the optical images.

In one embodiment of the invention, the matching may comprise: comparing a pattern in the edge portion of the first image with a pattern in the edge portion of the optical image, wherein determining, based on the comparing of patterns, if stitching of the first image with the optical image is possible, wherein when the stitching is successful, determining that there is a match between the edge portion of the first image and the edge portion of the optical image.

Stitching of images is a procedure where a first image (i.e. the first image) and an optical image (i.e. the optical image) is combined into a single image. This requires that the images match at the border between the images which thus sets some restraints on the location from which the images are acquired. The capacitive fingerprint sensor and the optical sensor may be arranged side-by-side such that the edge portion of the first image and the edge portion of the optical image enable a nearly seamless stitching of the images in case stitching is possible. The stitching is preferably performed on normalized images, in other words, the capacitive image is normalized with respect to the optical image or the optical image is normalized with respect to the capacitive image.

According to one embodiment of the invention, the method may further comprise: determining first output signal levels from sensing elements of the capacitive fingerprint sensor neighboring the border with the optical sensor configured to acquire the edge portion of the first image; determining second output signal levels from optical sensor units neighboring the sensing elements of the capacitive fingerprint at the border between the capacitive fingerprint sensor and the optical sensor, the optical sensor units being configured to acquire the edge portion of the optical image, determining a derivative of the output signal levels across from the edge portion of the first image to the optical image or across from the optical image to the edge portion of the first image, wherein, when the magnitude of the derivative is less than a threshold value, determining that there is a match between the edge portion of the first image and the edge portion of the optical image.

The first output signal levels may for example be a voltage signal indicative of the strength of the capacitive coupling between sensing structures and the object. The second output signal may be a voltage signal indicative of the intensity of the measured optical signal. The output signal levels are indicative of the image contribution from the respective sensing element and optical sensing unit. Each sensing elements and optical sensing unit may be regarded as "pixels" each contributing to a total image (the first representation image and the optical image). The derivative is determined from a function of sensing element output signal versus sensing element count or location in the array and from a function of optical sensor unit output signal versus optical sensor unit count or location in the array. The derivative includes the derivative of the function across the border between the first image and the optical image. The threshold may be determined from empirical studies using different kinds of spoof materials.

Advantageously, before determining the derivatives, it may be included to normalize the first output signal levels with respect to the second output signal levels or normalizing the second output signal levels with respect to the first output signal levels.

The capacitive fingerprint sensor may be a two-dimensional sensor and the optical sensor may be a one-dimensional sensor.

According to a second aspect there is provided a fingerprint sensing system comprising: a capacitive fingerprint sensor comprising an array of sensing elements for sensing a fingerprint pattern each sensing element having a sensing structure arranged in a sensing structure plane, the capacitive fingerprint sensor being configured to obtain a capacitive fingerprint image of a first portion of the user's finger, an optical sensor comprising an array of optical sensor units arranged adjacent to the array of sensing structures in the sensing structure plane, the optical sensor being configured to obtain an optical image of a second portion of the user's finger, the second portion and the first portion being neighboring portions, the fingerprint sensing system being configured to: acquire, using the capacitive fingerprint sensor, a first image of at least a first portion of an object; acquire, using the optical fingerprint sensor, a optical image of at least a second portion of the object, the optical image and the first image being representative of neighboring portions of the object; providing the first image and the optical image to a control unit configured to: match an edge portion of the first image with at least an edge portion of the optical image, the edge portion of the first image and the edge portion of the optical image representing the border between the capacitive fingerprint sensor and the optical sensor, wherein when there is a match, perform a fingerprint authentication procedure based on the first image and a plurality of fingerprint enrolment templates.

According to an embodiment of the invention, the array of sensing elements of the capacitive fingerprint sensor may be a two-dimensional array and the array of optical sensor units of the optical sensor may be a one-dimensional array arranged along an edge of the array of sensing elements.

According to an embodiment of the invention, the array of optical sensor units of the optical sensor may be arranged such that the array of sensing elements of the capacitive fingerprint sensor is surrounded by optical sensor units in the sensing structure plane. In other words, the optical sensor units are arranged as an array along all the edges of the array of sensing structures in the sensing structure plane. This advantageously enables matching several edge portions of the first image with several edge portions of the optical image which improves the ability to detect spoofs and may thereby improve authentication security even further.

In an embodiment of the invention, the optical sensor arrangement may comprise a light-emitting device configured to illuminate the object, wherein the optical sensor units are configured to detect the optical image in response to the illumination by the light-emitting device. The light-emitting device may for example be a light-emitting diode or another semiconductor based light-emitting device. In one example embodiment, a plurality of light-emitting diodes generates a combined light signal having a range of wavelengths. The light signal is used to illuminate the finger (or object) such that the optical sensor units can detect the optical image by transmission of reflection spectroscopy. The light signal from the light-emitting diodes may be guided to the finger or object with a light guide assembly.

The wavelength of the light emitted by the light emitting diodes may be any wavelength in the range between 308 nm to 1100 nm. For example, the wavelength of the light signal may be in the range 380 nm to 420 nm, or in the range 780 nm to 950 nm, such as about 400 nm, or about 940 nm, or about 780 nm. Of course deviations from the specified wavelengths are allowed, and each specified wavelength may have an error margin of about 10% (e.g. 400 nm±20 nm).

This second aspect of the invention provides similar advantages as discussed above in relation to the previous aspect of the invention.

According to third aspect of the present invention, there is provided an electronic device comprising a fingerprint sensing system according to the previous aspect and the control unit. The control unit is configured to: control the capacitive fingerprint sensor to acquire a first image of at least a portion of an object; control the optical fingerprint sensor to acquire a optical image of at least a portion of the object, the optical image and the first image being representative of neighboring portions of the object; match an edge portion of the first image with at least an edge portion of the optical image, the edge portion of the first image and the edge portion of the optical image representing the border between the capacitive fingerprint sensor and the optical sensor, wherein when there is a match, perform a fingerprint authentication procedure based on the first image and a plurality of fingerprint enrolment templates.

The electronic device may be a mobile phone.

This third aspect of the invention provides similar advantages as discussed above in relation to the previous aspects of the invention.

According to a fourth aspect of the present invention, there is provided a computer program product comprising a computer readable medium having stored thereon computer program means for controlling an electronic device, the electronic device comprising: a control unit; a capacitive fingerprint sensor comprising an array of sensing elements for sensing a fingerprint pattern each sensing element having a sensing structure arranged in a sensing structure plane, the capacitive fingerprint sensor being configured to obtain a capacitive fingerprint image of a first portion of the user's finger; and an optical sensor comprising an array of optical sensor units arranged adjacent to the array of sensing structures in the sensing structure plane, the optical sensor being configured to obtain an optical image of a second portion of the user's finger, the second portion and the first portion being neighboring portions, wherein the computer program product comprises: code for controlling the capacitive fingerprint sensor to acquire a first image of at least a portion of an object code for controlling the optical fingerprint sensor to acquire a optical image of at least a portion of the object, the optical image and the first image being representative of neighboring portions of the object; code for matching an edge portion of the first image with at least an edge portion of the optical image, the edge portion of the first image and the edge portion of the optical image representing the border between the capacitive fingerprint sensor and the optical sensor, and code for, when there is a match, performing a fingerprint authentication procedure based on the first image and a plurality of fingerprint enrolment templates.

This fourth aspect of the invention provides similar advantages as discussed above in relation to the previous aspects of the invention.

With a capacitive fingerprint sensor, a measure is detected indicative of the capacitive coupling between each sensing element in an array of sensing elements and a finger (or object) surface touching the fingerprint sensor surface. Sensing elements at locations corresponding to ridges in the fingerprint will exhibit a stronger capacitive coupling to the finger than sensing elements at locations corresponding to valleys in the fingerprint. Both one and two-dimensional sensors are possible and within the scope of the invention. Furthermore, the electronic device may advantageously be a mobile phone. However, other electronic devices are of course thinkable such as tablets, laptops desktop computers, etc.

The optical sensor may advantageously be an optical fingerprint sensor configured to acquire an optical image representative of at least a portion of a user's fingerprint.

Within the context of the invention, the expression "fingerprint image" should be interpreted broadly and to include both a regular "visual image" of a fingerprint of a finger as well as a set of measurements relating to the finger when acquired using the fingerprint sensor. In addition, the expression "control unit" should be understood to include any type of computing device, such as an ASIC, a micro-processor, etc. It should also be understood that the actual implementation of such a control unit may be divided between a plurality of devices/circuits.

In summary, the present invention generally relates to authenticating a user of an electronic device comprising a capacitive fingerprint sensor and an optical sensor arranged side-by-side with the capacitive fingerprint sensor. In accordance with the present invention a first image of at least a first portion of an object is acquired using the capacitive fingerprint sensor and an optical image of at least a second portion of the object is acquired using the optical sensor, the optical image and the first image being representative of neighboring portions of the object. An edge portion of the first image is matched with at least an edge portion of the optical image, where the edge portions represent the object at the border between the capacitive fingerprint sensor and the optical sensor. When there is a match, a fingerprint authentication procedure may be performed.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIG. 9a-b conceptually illustrates an embodiment of the invention; and

DETAILED DESCRIPTION

Figure 1:
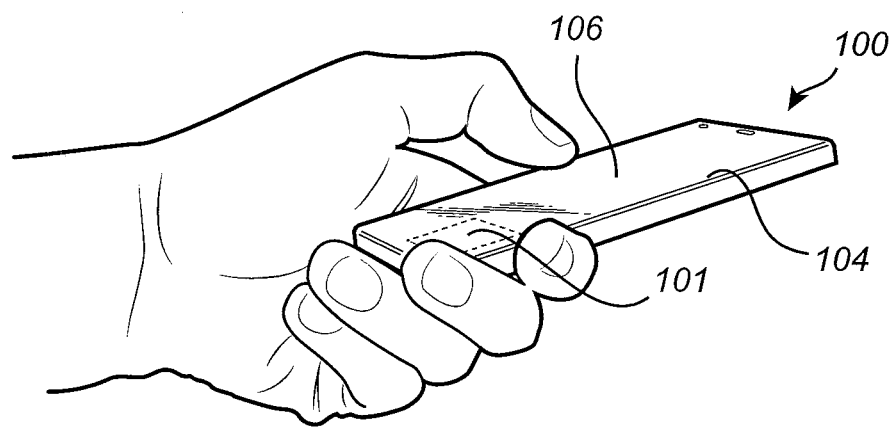
FIG. 1 schematically exemplify an electronic device according to the present invention, in the form of a mobile phone comprising an integrated fingerprint sensor.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated the electronic device according to the present invention, in the form of a mobile phone 100 with an integrated fingerprint sensor 101 and a display unit 104 with a touch screen interface 106. In this embodiment the fingerprint sensor 102 and the display unit 104 are together arranged at the front side of the mobile phone 100. The fingerprint sensor 101 may, for example, be used for unlocking the mobile phone 100 and/or for authorizing transactions carried out using the mobile phone 100, etc. The fingerprint sensor 101 may of course also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
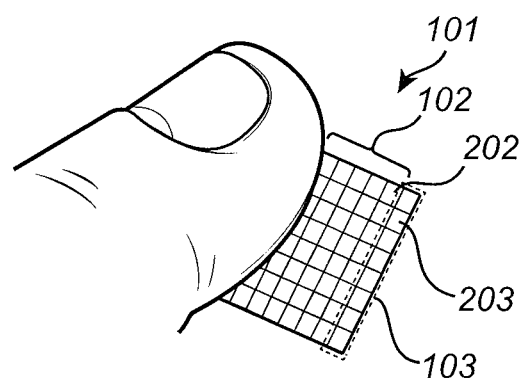
FIG. 2 schematically shows the fingerprint sensor array comprised in the electronic device in FIG. 1.

With reference to FIG. 2, there is conceptually illustrated a somewhat enlarged view of the fingerprint sensor 101. The fingerprint sensor 101 comprises a capacitive fingerprint sensor 102 configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202. Furthermore, arranged side-by-side with the capacitive fingerprint sensor 102 there is an optical sensor 103 comprising an array of optical sensing units 203 (only one is numbered). In this conceptual drawing, the optical sensor 103 comprises a one-dimensional array of optical sensor units 203. However, the optical sensor may likewise comprise a two-dimensional array of optical sensor units 203.

Figure 3:
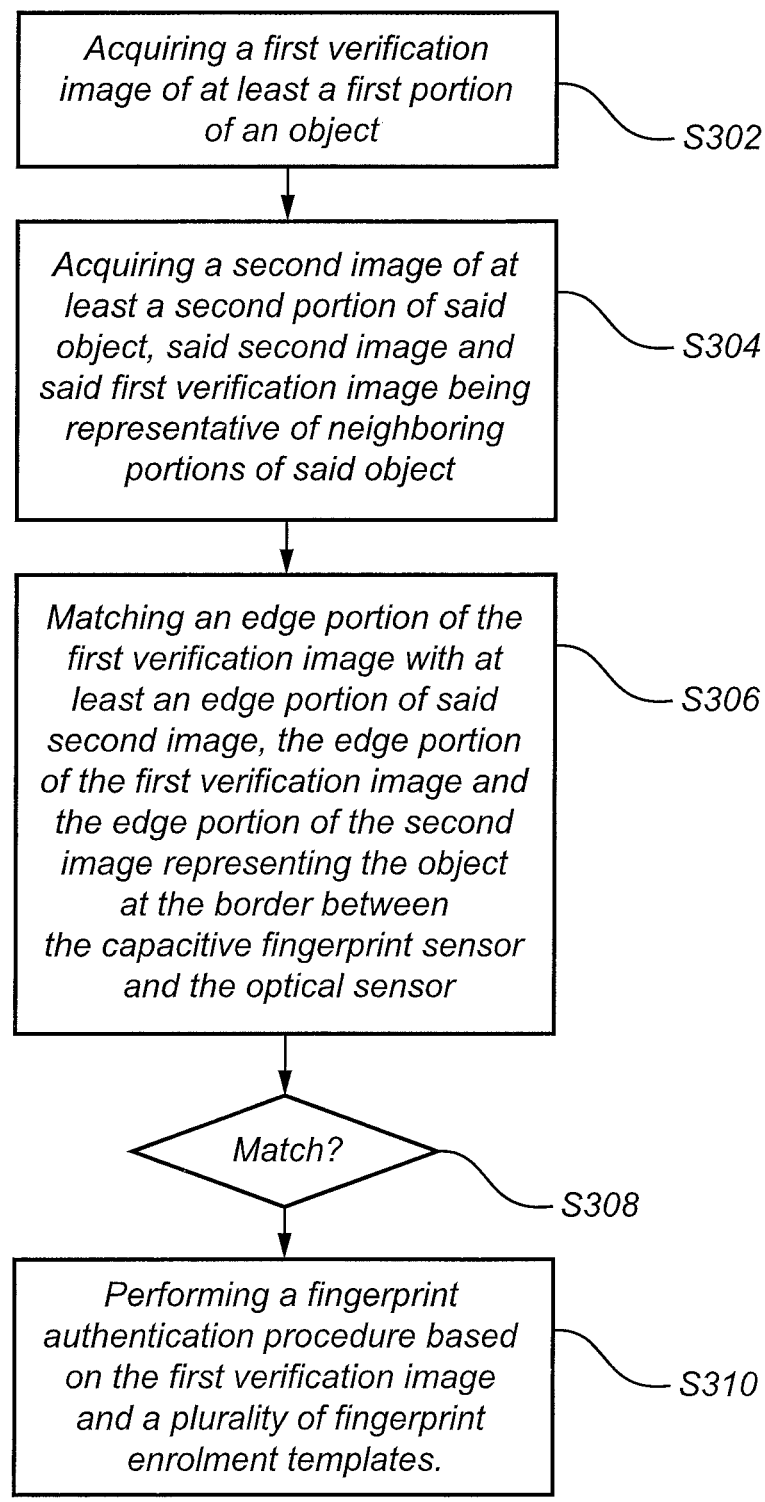
FIG. 3 is a flow-chart of method steps according to an embodiment of the invention.

Now with reference to FIG. 3 showing a flow-chart of method steps according to an embodiment of the invention. In a first step S302 a first image of at least a portion of an object is acquired using a capacitive fingerprint sensor. In a second step S304, an optical image is acquired of the object using an optical sensor. The optical image is an image of at least a portion of the object. The optical image and the first image are representative of neighboring portions of the object. Next S306, an edge portion of the first image is matched with at least an edge portion of the optical image, the edge portions representing the object at the border between the capacitive fingerprint sensor and the optical sensor. If the edge portions match (S308), a fingerprint authentication procedure is performed in step S310 based on at least the first image and a plurality of fingerprint enrolment templates. Furthermore, in step S310, in the optical image may also be used in the authentication procedure, in such case a verification representation of the optical image signal and of the capacitive image is compared with enrolment representations of the optical image signal and of the capacitive image. In addition, it may further be included to acquire a set of optical images at different wavelengths, and performing the matching for each of the wavelengths, whereby a match has to be found for each wavelength.

The matching of edge portions may be performed in different ways of which some are described with reference to FIGS. 6-9.

Figure 4A:
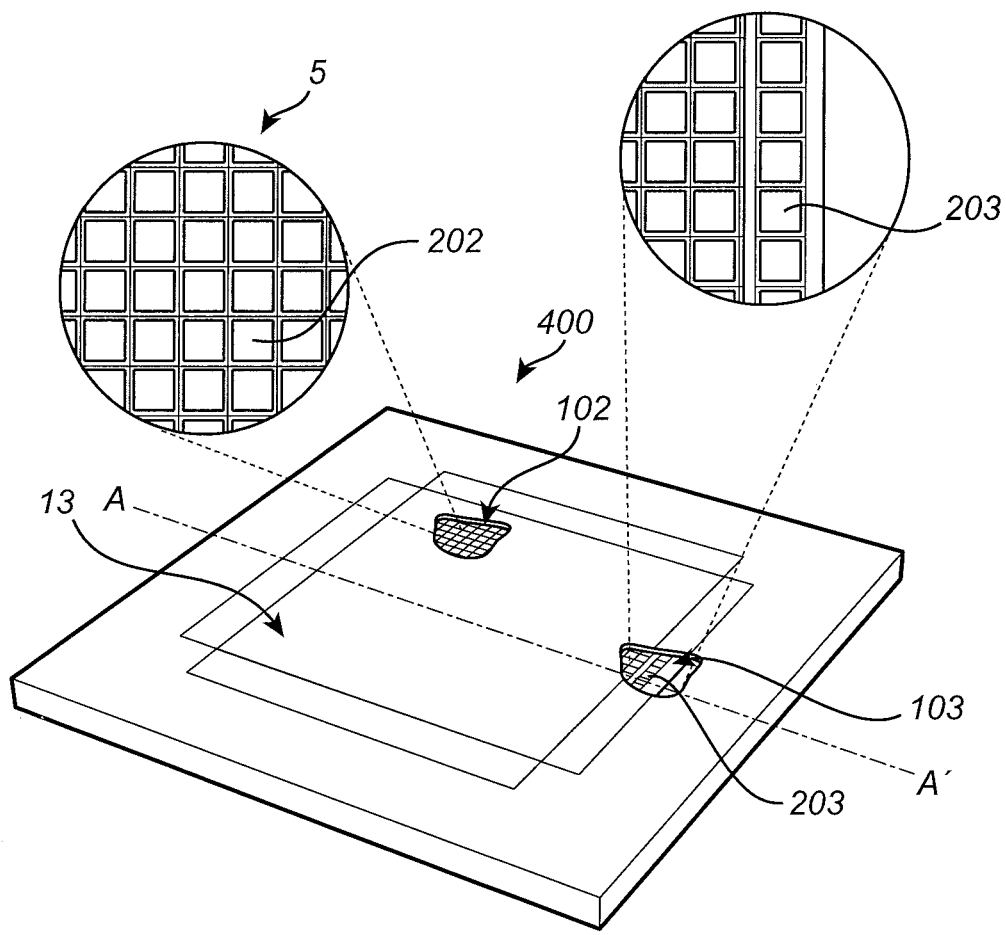
FIGS. 4a-4c conceptually show a fingerprint sensing system according to an example embodiment of the invention.
Figure 4B:
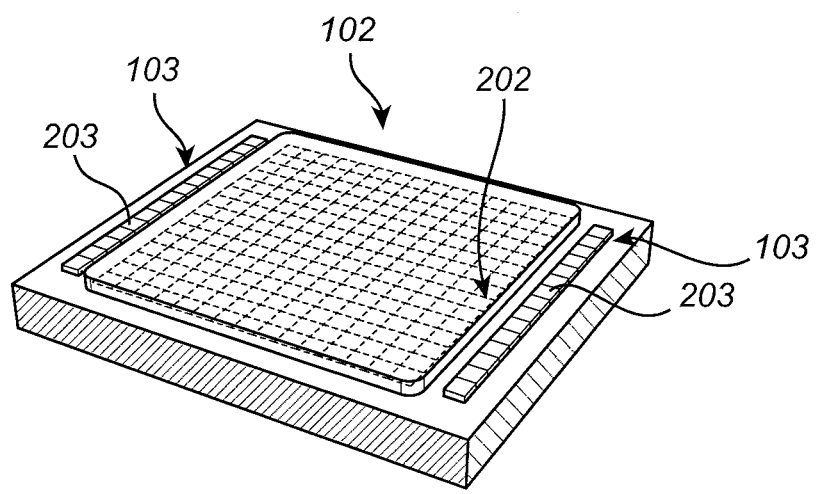
Figure 4C:

FIG. 4 a-b conceptually illustrates a fingerprint sensing system 400 according to an example embodiment. The difference between FIG. 4a and FIG. 4b is that in FIG. 4a, the capacitive fingerprint sensor and the optical sensor are covered by a protective dielectric layer 13. The fingerprint sensing system 400 comprises an array 5 of sensing elements of which one is denoted 202. The sensing elements comprises a sensing structure (see FIG. 5) arranged in a sensing structure plane. The fingerprint sensing system further comprises an optical sensor 103 comprising an array of optical sensing units 203 (only one is numbered). The array of optical sensing units 203 are arranged side-by-side with the sensing elements 202 of the capacitive fingerprint sensor. With this side-by-side configuration the capacitive fingerprint sensor 102 and the optical sensor 103 may obtain images of the object, for example a finger fingerprint, being representative of neighboring portions of the object as is conceptually illustrated in FIG. 4c.

FIG. 4c conceptually shows a representation of a capacitive fingerprint sensor 102 and a representation of a optical sensor 103 arranged side by side and having a fingerprint overlaid for illustrative purposes covering part of the capacitive sensor 102 and the optical sensor 103. The border between the optical sensor 103 comprising optical sensing units 203 (see FIG. 4a-b) and the capacitive fingerprint sensor 102 having sensing elements 203 (see FIG. 4a-b) is indicated by the thick frame line 408. The first image 402 (inside the line 408) of at least a portion of the object (in this case a finger fingerprint) is acquired by the sensing elements 202 of the capacitive fingerprint sensor 102. An optical image 403 of at least a second portion of the object is acquired by the optical sensing units 203 of the optical sensor 103. The first image 402 and the optical image 403 are representative of neighboring portions of the object.

Still with reference to FIG. 4c (in conjunction with FIGS. 4a-b), edge portions of the images 402, 403 that are used in a matching step are an edge portion 404 of the first image 402 and a neighboring edge portion 405 of the optical image 403 where the edge portions represent the object at the border between the capacitive fingerprint sensor and the optical sensor, i.e. at the border between neighboring sensing elements 202 and optical sensing units 203.

Figure 5:
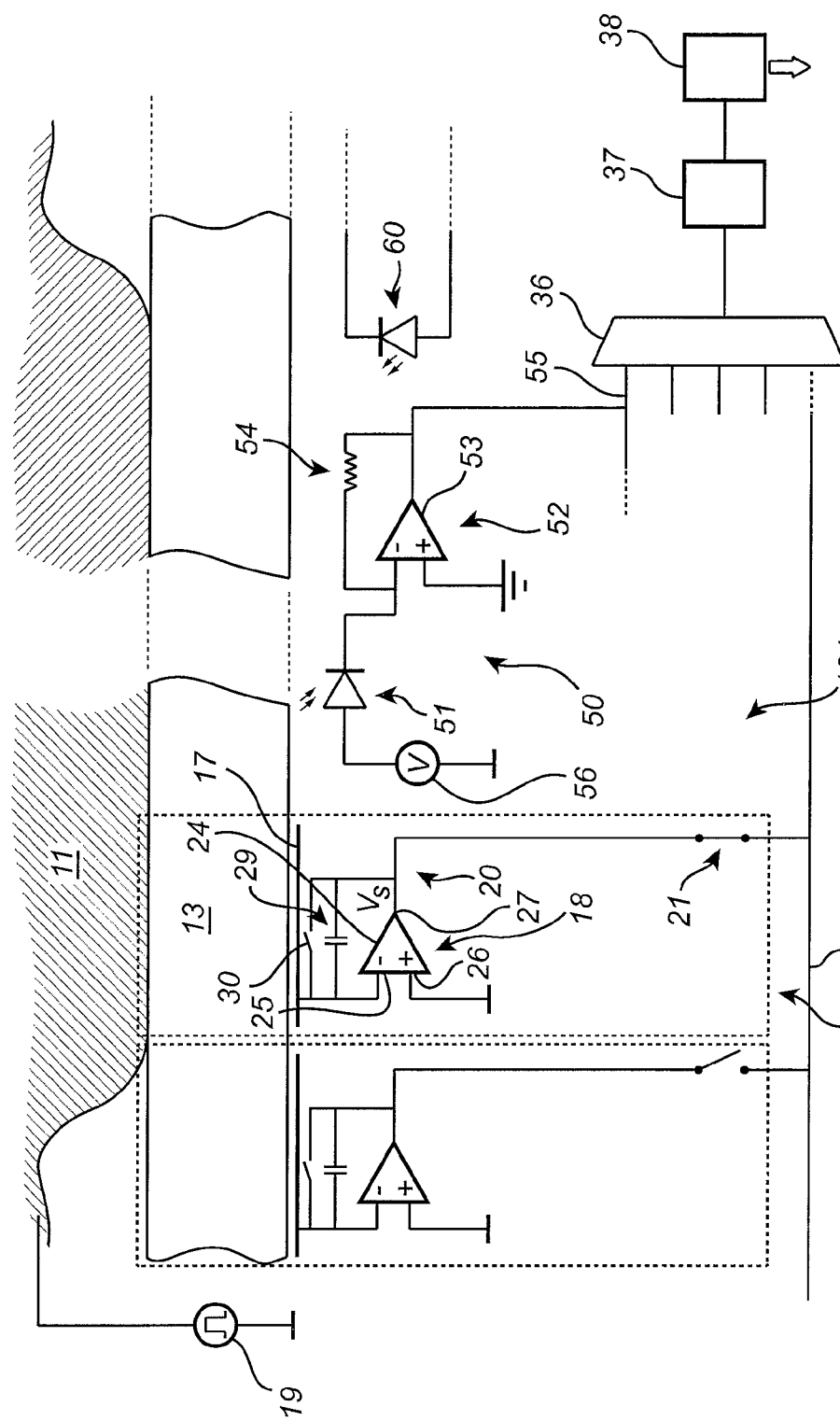
FIG. 5 is a schematic cross section of a portion of a fingerprint sensor.

FIG. 5 is a schematic cross section of a portion of the fingerprint sensor 101 in FIG. 2 taken along the line A-A' as indicated in FIG. 4a with a finger 11 placed on top of a protective dielectric top layer 13 covering the sensor array 5 and the optical sensing unit 50. Referring to FIG. 5, the fingerprint sensing device 101 comprises an excitation signal providing circuit 19 electrically connected to the finger via a conductive finger drive structure (not shown in FIG. 5), a plurality of sensing elements 8, and an optical sensing unit 50 comprising a light emitting device 60.

As is schematically indicated in FIG. 5, each sensing element 8 comprises a conductive sensing structure, here in the form of a metal plate 17 underneath the protective dielectric top layer 13, a charge amplifier 18, and selection circuitry, here functionally illustrated as a simple selection switch 21 for allowing selection/activation of the sensing element 8.

The charge amplifier 18 comprises at least one amplifier stage, here schematically illustrated as an operational amplifier (op amp) 24 having a first input (negative input) 25 connected to the sensing structure 17, a second input (positive input) 26 connected to sensor ground or another reference potential, and an output 27. In addition, the charge amplifier 18 comprises a feedback capacitor 29 connected between the first input 25 and the output 27, and reset circuitry, here functionally illustrated as a switch 30, for allowing controllable discharge of the feedback capacitor 29. The charge amplifier 18 may be reset by operating the reset circuitry 30 to discharge the feedback capacitor 29.

As is often the case for an op amp 24 in a negative feedback configuration, the voltage at the first input 25 follows the voltage at the second input 26. Depending on the particular amplifier configuration, the potential at the first input 25 may be substantially the same as the potential at the second input 26, or there may be a substantially fixed offset between the potential at the first input 25 and the potential at the second input 26. In the configuration of FIG. 5, the first input 25 of the charge amplifier is virtually grounded.

When a time-varying potential is provided to the finger 11 by the excitation signal providing circuitry 19, a corresponding time-varying potential difference occurs between the sensing structure 17 and the finger 11.

The above-described change in potential difference between the finger 11 and the sensing structure 17 results in a sensing voltage signal Vs on the output 27 of the charge amplifier 18.

When the indicated sensing element 8 is selected for sensing, the selection switch 21 is closed to provide the sensing signal to the readout line 33. The readout line 33, which may be a common readout line for a row or a column of the sensor array 5 in FIG. 4a, is shown in FIG. 5 to be connected to a multiplexer 36. As is schematically indicated in FIG. 5, additional readout lines from other rows/columns of the sensor array 5 may also be connected to the multiplexer 36.

Furthermore, an optical sensing unit 50 is schematically shown. The optical sensing unit comprises an optical sensor, here in the form of a photodiode 51 power by voltage source 56, an amplifier stage 52 comprising an operational amplifier 53 and a feedback resistor 54. The operational amplifier is this case is configured in a negative feedback configuration as described above. The output of the optical sensing unit 50 is connected to the multiplexer 36 with a read-out line 55 common for the optical sensing units. Furthermore, a light-emitting device in the form of a light-emitting diode 60 may be arranged to illuminate the object, in this example the finger 11, with specific wavelengths for transmission or reflection spectroscopy. The light may be guided from the light-emitting device 60 via a light guide of a suitable type such as an optical fiber.

The output of the multiplexer 36 is connected to a sample-and-hold circuit 37 and an analog-to-digital converter 38 in series for sampling and converting the analog signals originating from the sensing elements 8 and the optical sensing units to a digital representation of the fingerprint pattern (e.g. the first image and the optical image) of the finger 11 on the sensor 2.

In FIG. 5, the finger 11 is shown as being connected to an excitation circuit 19 for providing the desired potential difference between the finger 11, and the sensing plates 17 of the sensor array 5. It should be noted that this desired potential difference may alternatively be provided by changing the ground level of the fingerprint sensing device in relation to the ground level of the electronic device (such as mobile phone 100) in which the fingerprint sensing device 2 is included.

Figure 6:
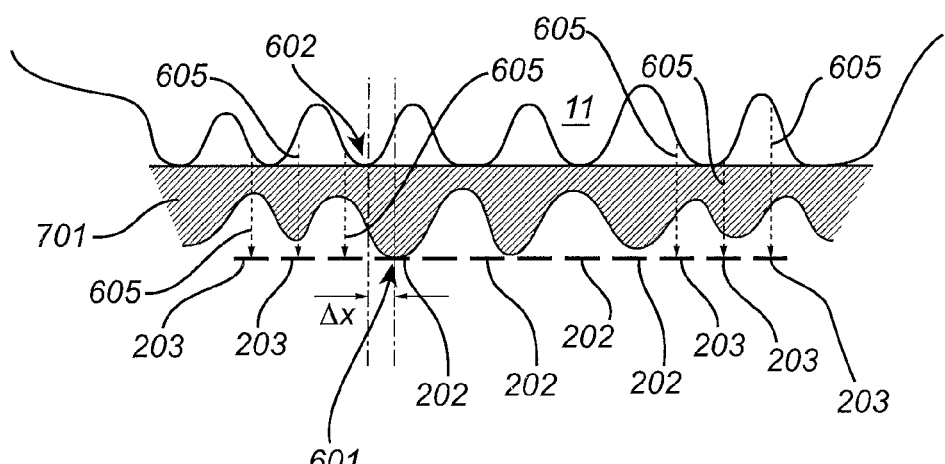
FIG. 6 conceptually illustrates capacitive sensing and optical sensing of a spoof attached to a live finger.

FIG. 6 conceptually illustrates capacitive sensing and optical sensing of a spoof 701 attached to a live finger 11. Schematic sensing elements 202 of a capacitive fingerprint sensor are arranged in an array and side-by-side with the sensing elements 202 there are optical sensing units 203. Sensing structures of the capacitive sensing elements 202 are in contact with the spoof 701 (via a protective dielectric layer, not shown). In this particular example, the properties of the spoof are such that the capacitive fingerprint sensor senses the capacitive coupling between the spoof 701 and the sensing structures. Thereby, the output fingerprint image captured by the capacitive fingerprint sensor represents a surface image of the spoof 701. In contrast, the optical sensor comprising the optical sensing units 203 captures an optical image. In this case, the optical image may include information about the finger behind the spoof since optical signals 605 may travel through the spoof 701. For example, if the spoof 701 is transparent or at least partly transparent (in the visible range of wavelengths) the optical image will include information about the fingerprint of the finger 11 behind the spoof 701. For wavelengths outside the visible range, a transmission or reflection spectroscopy be used. Naturally, transmission or reflection spectroscopy may be used also for the visible range of wavelengths. Accordingly, the optical sensor units 203 and the capacitive fingerprint sensor elements 202 acquires images at different distances from the respective sensor surface (e.g. different depths of the spoof-finger combination). For some properties of the spoof material, the capacitive sensor may at least partly sense the finger behind the spoof and the optical sensor may sense the spoof finger. Thus, the capacitive sensor and the optical sensor senses structures at different depths from the respective sensing area.

With further reference to FIG. 6, a spoof 701 fingerprint arranged on a live finger as indicated in FIG. 6 naturally results in a shift (ix) between ridges 601 (or valleys) of the spoof 701 compared to ridges 602 (or valleys) of the live finger 11 since the spoof 701 fingerprint and the fingerprint of the live finger 11 do not match. Thus, if part of the fingerprint of the live finger 11 imaged by the optical sensor is compared to the fingerprint of the spoof 701 imaged by the capacitive fingerprint sensor are compared, they will not match at the border between the capacitive fingerprint sensor and the optical sensor and from this difference at the border between the images it can be concluded that a spoof is present.

Figure 7:
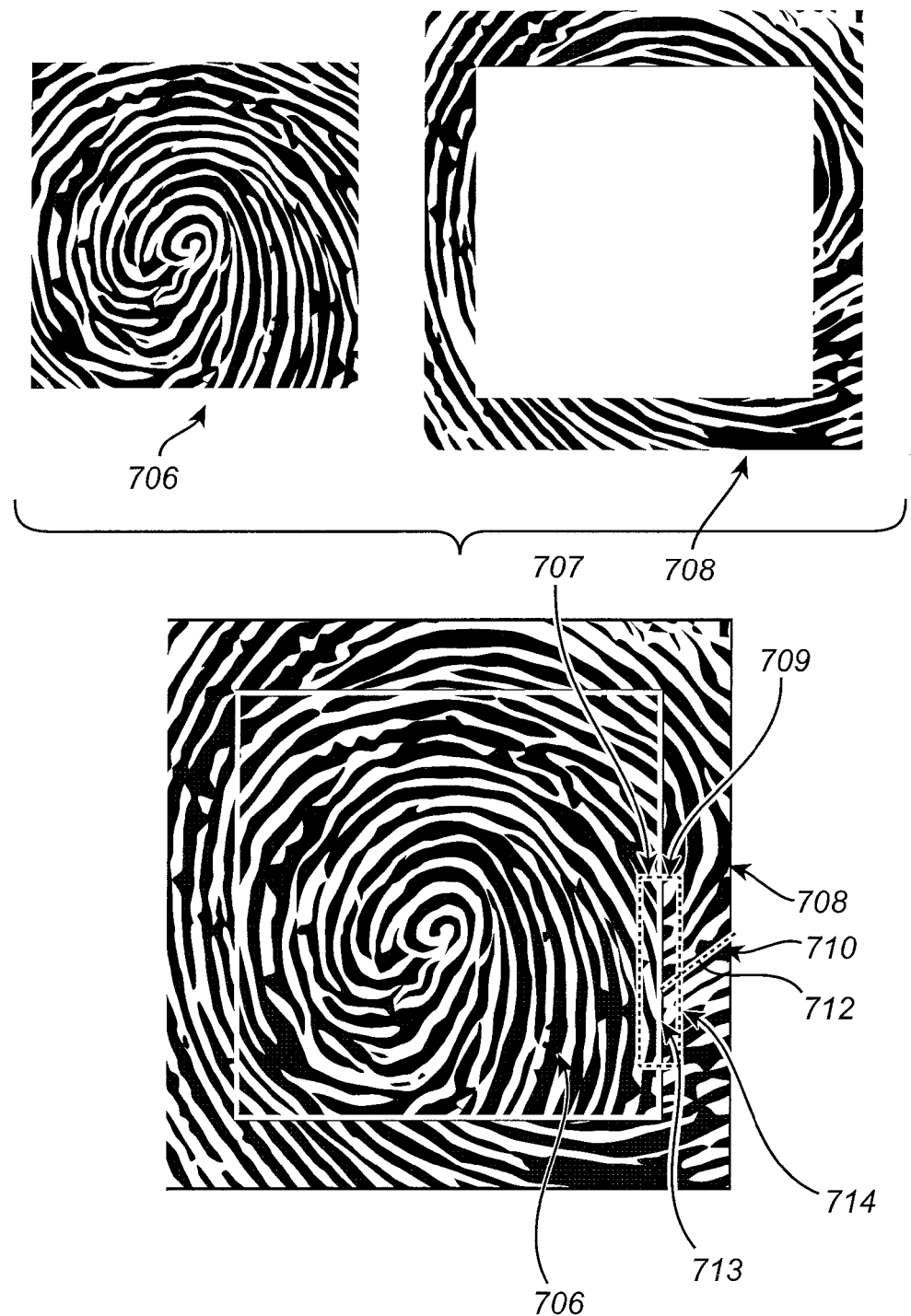
FIG. 7 conceptually shows a representation of a first image with the bordering optical image.

One way to determine whether the capacitive image obtained with the capacitive fingerprint sensor and the optical image obtained with the optical sensor matches is to attempt to stitch the images (first image and optical image) together. If no spoof is present, thus the capacitive fingerprint sensor and the optical sensor both images a live fingerprint, the images would be possible to stitch together to form a combined image of the live fingerprint. If combined together, the combined image may be used for enrolment and/or verification. In contrast, if a spoof is arranged on a live finger, the optical image would not be possible to stitch with the capacitive image since the images would not match (see FIG. 6). FIG. 7 shows a representation of a capacitive image 706 with the bordering optical image 708. As illustrated in FIG. 7, the capacitive image 706 is not stitchable with the optical image 708 since the fingerprint pattern sensed by the capacitive fingerprint sensor (not shown) does not correlate with the fingerprint pattern sensed by the optical sensor (not shown). For example, with focus on the images 708 and 706 inside the dashed box 714, it can be seen that the pattern in the optical image portion 709 does not match the pattern in the capacitive first image portion 707 at the border between the images. The stitching may for example be performed by finding features such as ridges or valleys, via image processing in the capacitive image (or optical image) at the edge of the capacitive image 706 and attempting to match with corresponding features in the optical image 708.

Furthermore, still with reference to FIG. 7, the attempt to stitch may be performed with optical images acquired at different wavelengths. Thus, a set of optical images may be acquired at different wavelengths. For example, the set of optical images may comprise at least a first optical image acquired at a first wavelength range and a second optical image acquired at a second wavelength range different from the first wavelength range. For determining that there is a match between the first image 706 and the optical images including image 708 each of the optical images is required have an edge portion which matches the edge portion of the capacitive image 706. Another example of detecting a spoof in accordance with an embodiment of the invention will now be described with reference to FIG. 8 in conjunction with FIG. 7.

Figure 8:
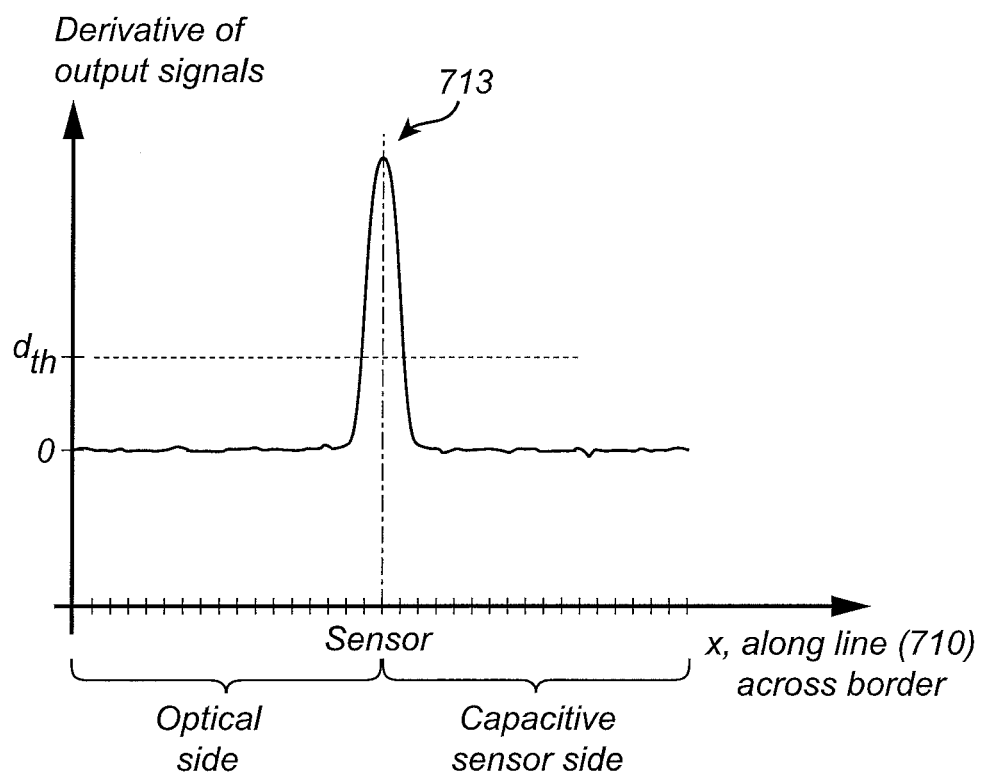
FIG. 8 conceptually shows a derivative of output signals from optical sensing units and capacitive sensing elements across the border between the images.

In this example embodiment described with reference to FIG. 8 and FIG. 7, a derivative of output signal levels from sensing elements of the capacitive fingerprint sensor is compared with a derivative of output signal levels from the optical sensor units across the border between the images. The signal levels may for example be voltage levels output from the sensing elements and optical sensor units. As an example, the derivative of output signal levels along a hypothetical line 710 in FIG. 7 is shown in FIG. 8. The line 710 is aligned with a ridge 712 of the fingerprint imaged by the optical sensor. The output signal level on the optical sensor side is relatively constant, thus resulting in a derivative close to zero, or fluctuating around zero. At the border 713 between the optical image and the capacitive image, the derivative suddenly changes due to the absence of the ridge 712 in the capacitive image 706 (or image portion 707). This causes the magnitude of the derivative to be larger than a threshold value $d_{th}$ which indicates that the images do not match which is indicative of the presence of a spoof, whereby fingerprint authentication is not performed. In contrast, when the magnitude of the derivative is less than the threshold value $d_{th}$ across the border 713, it can be determined that there is a match between the edge portion of the first image and the edge portion of the optical image. The threshold $d_{th}$ is empirically determined using known spoof materials. The embodiment described with reference to FIG. 8 may be performed with each of the optical images in a set of optical images, or a single one of the optical images in the set of optical images. In case several optical images are used, each of the optical images must be determined to match the capacitive image according to the described method, for the overall match to be positive, i.e. the derivative for each of the transitions from the capacitive image to the respective optical image must be below the threshold.

Figure 9A:
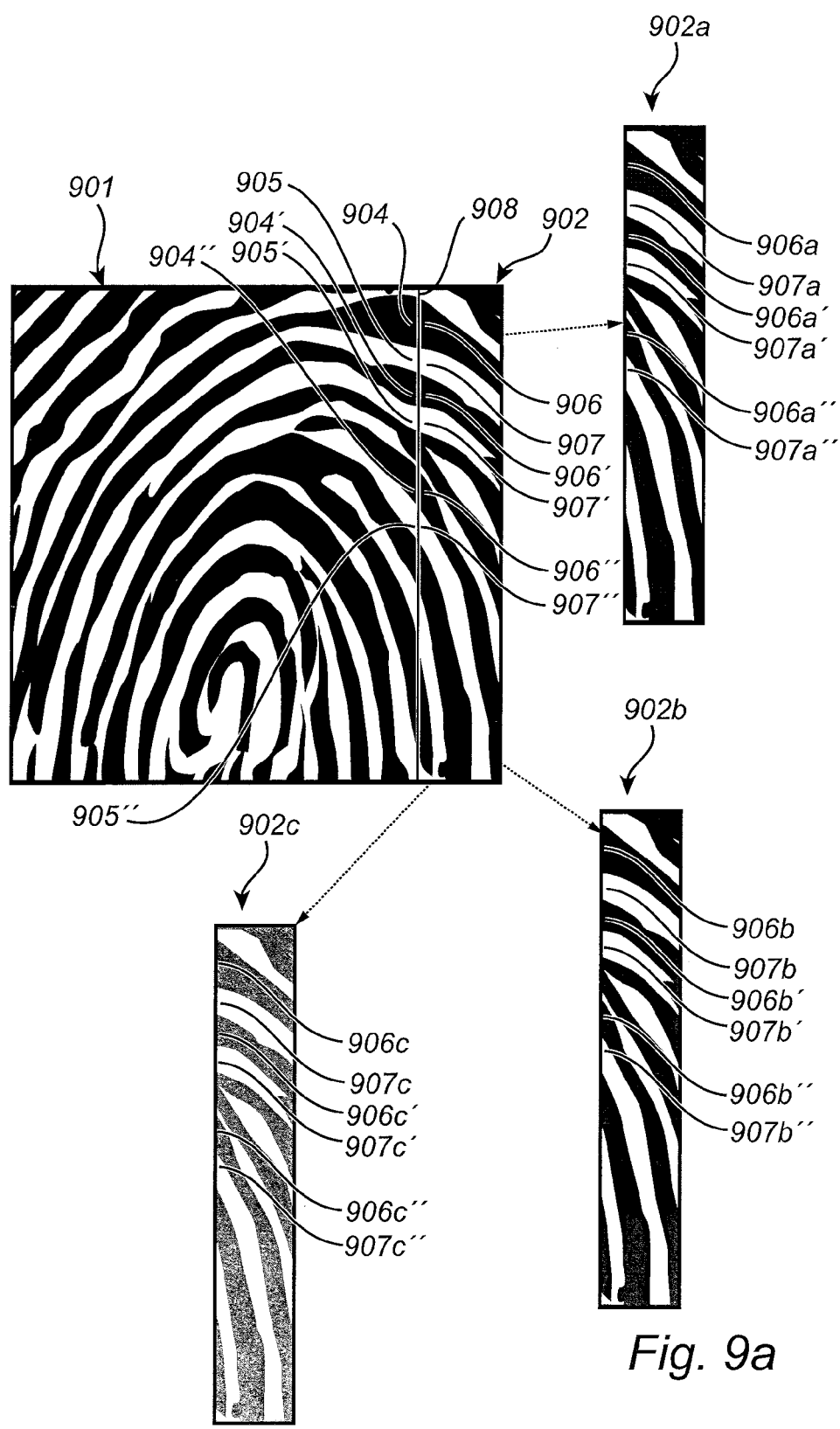
Figure 10:
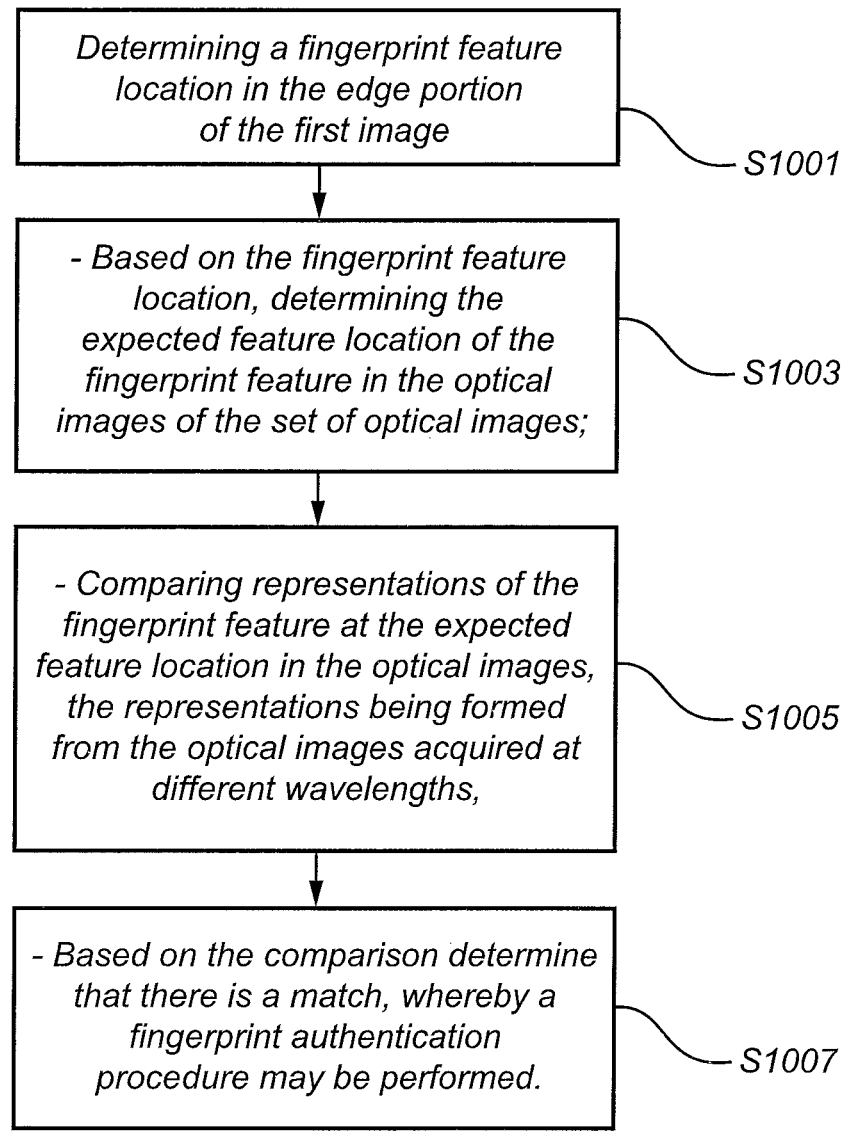
FIG. 10 is a flow-chart of method steps according to an embodiment of the invention.

FIG. 10 is a flow-chart of method steps according to an embodiment of the invention. In a first step S1001, a fingerprint feature location is determined in the edge portion of the first image. Subsequently S1003, based on the fingerprint feature location, an expected feature location of the fingerprint feature in each of the optical images of the set of optical images is determined. Representations of the fingerprint feature at the expected feature location in the optical images may be compared S1005 to each other, the representations being formed from the optical images acquired at different wavelengths. Based on the comparison it may be determined S1007 that there is a match, whereby a fingerprint authentication procedure may be performed. FIG. 9*a-b* will now describe one possible implementation of the method steps shown in FIG. 10.

FIG. 9*a* conceptually illustrates an embodiment of the invention. In FIG. 9 there is shown a (partial) capacitive image 901 bordering with a (partial) optical image 902. In order to determine whether or not the capacitive image 901 matches with the optical image 902, a fingerprint feature location is found in the edge portion of the capacitive image 901, in this case a location 904 of a ridge and the location of a valley 905 in the fingerprint are determined. Based on the locations 904 and 905, the expected location of the fingerprint feature in the optical image 902 may be found by e.g. following the ridge or valley over from the capacitive image 901 to the optical image 902 using e.g. suitable image processing. Alternatively, as illustrated in FIG. 9, the locations 904, 905 of the ridge and valley are extrapolated across the border 908 to the optical image 902. Thus, the location in the optical image 902 corresponding to an optical sensing unit (e.g. pixel) neighboring the sensing structure (e.g. pixel) of the capacitive sensor on the capacitive image 901 side at which the ridge location 904 is found is determined to be the expected location 906 of the ridge in the optical image. Similarly, the location in the optical image 902 corresponding to an optical sensing unit (e.g. pixel) neighboring the sensing structure (e.g. pixel) of the capacitive sensor on the capacitive image 901 side at which the valley location 905 is found is determined to be the expected location 907 of the valley in the optical image. A set of expected ridge locations 906, 906', 906" (only three are shown here as an example, more than three expected locations may be used) in the optical image(s) is determined based on a set of ridge locations 904, 904', 904" (only three are shown here as an example, more than three expected locations may be used) in the capacitive image 901. Further, a set of expected valley locations 907, 907', 907" (not all numbered to avoid cluttering the drawings) in the optical image(s) is determined based on a set of valley locations 905, 905', 905" (not all numbered to avoid cluttering the drawings) in the capacitive image 901.

As illustrated in FIG. 9a, there are acquired a set of optical images 902a-c at different wavelengths. The expected locations 906a-c, 906'a-c, 906"a-c and 907a-c, 907'a-c, 907"a-c may be determined in each of the optical images 902a-c. From the expected locations 906a-c, 906'a-c, 906"a-c, and 907a-c, 907'a-c, 907"a-c, there may be determined signal levels in each of the images 902a-c corresponding to ridges and valleys. For each of the images 902, 902a-c an average ridge signal levels and average valley signal levels may be determined based on the set of expected ridge locations and based on the expected valley locations. In other words, a first average ridge signal level may be determined for the optical image 902a acquired at a first wavelength, a second average ridge signal level may be determined for the optical image 902a acquired at a second wavelength, and a third average ridge signal level may be determined for the optical image 902a acquired at a third wavelength, etc. Furthermore, a first average valley signal level may be determined for the optical image 902a acquired at a first wavelength, a second average valley signal level may be determined for the optical image 902a acquired at a second wavelength, and a third average valley signal level may be determined for the optical image 902a acquired at a third wavelength, etc. The average ridge and average valley signals are thereafter normalized (FIG. 9b) with respect to the average ridge signal and average valley signal obtained from one of the wavelengths. In other words, for each optical image 902, 902a-c a normalized average ridge signal level is determined with respect to one of the first, the second, or the third a first average ridge signal. Further, a normalized average valley signal level is determined with respect to the same one of the first, the second, or the third average valley signal as in the case of the normalized average ridge signal level normalization.

With further reference to FIG. 9a-b, the normalized average valley signal level is compared with the normalized average ridge signal level for each wavelength. A difference between the normalized average valley signal level and the normalized average ridge signal level may be indicative of the presence of a spoof or a live finger. The difference (e.g. subtraction) may for example be compared to a threshold value which is empirically determined on known spoof materials and live fingers. Alternatively or additionally, the comparisons should agree (within an error margin) for the different wavelengths for determining the presence of a live finger without a spoof (i.e. that the first image matches the optical image). If the comparisons do not agree, this is indicative of the presence of a spoof. The working principle is based on that a live finger may have a known absorption at different wavelengths which is difficult to mimic with spoof materials. In addition, in the presence of a spoof, the optical images at different wavelengths include ratios of information from the spoof and the finger due to different absorption rates of the spoof material at different wavelengths. For example, in the case of a live finger, there is only one structure to optically image which is the live fingerprint pattern. In the case of a spoof in combination with a finger, the absorption of the spoof material at a wavelength determines the "visibility" of the live finger through the spoof material. The "visibility will be different depending on the wavelength and thereby will also the comparisons deviate from each other in the presence of a spoof.

In one embodiment, for each of the wavelengths a normalized average valley signal is compared with another normalized average valley signal. In other words, instead of comparing ridge-valley, it is also possible to compare valley-valley. In a similar way it is also possible to compare ridge-ridge. For example, a first and a second average valley signal levels may be determined from subsets of the signal output values from subsets of the expected valley locations 907, 907', 907", for each of the wavelengths. These first and second average valley signal levels may thereafter be normalized with respect to an average valley signal level for one of the wavelengths and the respective subset of expected locations. Comparing the first normalized valley ridge signal level to the second normalized average valley signal level it may be determined whether or not there is a match between the edge portion of the first image and the edge portion of each of the optical images in a similar manner as described with respect to the ridge-valley case.

It should be noted that the sensing element size and the optical sending unit size in the depicted embodiments are oversized for clarity in the drawings.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensor, or may be part of the electronic device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for authenticating a user of an electronic device comprising:
   a capacitive fingerprint sensor comprising an array of sensing elements for sensing a fingerprint pattern, each sensing element having a sensing structure arranged in a sensing structure plane, said capacitive fingerprint sensor being configured to obtain a capacitive image of a first portion of a user's finger, and
   an optical sensor arranged side-by-side with said capacitive fingerprint sensor, said optical sensor comprising an array of optical sensor units arranged adjacent to said array of sensing structures in said sensing structure plane, said optical sensor being configured to obtain an optical image of a second portion of said user's finger, said second portion and said first portion being neighboring portions, wherein said method comprising the steps of:
   acquiring, using the capacitive fingerprint sensor, a first image of at least a first portion of an object;
   acquiring, using the optical sensor, a optical image of at least a second portion of said object, said optical image and said first image being representative of neighboring portions of said object;
   matching an edge portion of the first image with at least an edge portion of said optical image, the edge portion of the first image and the edge portion of the optical image representing the object at the border between the capacitive fingerprint sensor and the optical sensor, wherein when there is a match,
   performing a fingerprint authentication procedure based on at least one of the first image and the optical image, and a plurality of fingerprint enrolment templates.

2. The method according to claim 1, further comprising:
   acquiring, using the optical sensor, a set of optical images comprising at least a first optical image acquired at a first wavelength range and a second optical image acquired at a second wavelength range different from the first wavelength range; wherein said step of matching of the edge portion of the first image with at least an edge portion of said optical image comprises:
   matching said edge portion of said first image with an edge portion of each of the optical images in the set of optical images.

3. The method according to claim 2, further comprising:
   normalizing said set of optical images with respect to one of the optical images in the set of optical images.

4. The method according to claim 2, further comprising:
   determining a fingerprint feature location in the edge portion of said first image;
   based on the fingerprint feature location, determining the expected feature location of the fingerprint feature in the optical images of the set of optical images;
   comparing representations of the fingerprint feature at the expected feature location in the optical images to each other, the representations being formed from the optical images acquired at different wavelengths, wherein
   based on the comparison determine that there is a match, whereby a fingerprint authentication procedure may be performed.

5. The method according to claim 4, further comprising:
   determining a set of ridge locations and a set of valley locations in the edge portion of said first image;
   based on the ridge and valley positions in the first image, determining a set of expected ridge locations and a set of expected valley locations in each of the optical images acquired at different wavelengths;
   based on output signal levels at said expected ridge locations and expected valley locations in the optical images, for each optical image acquired at different wavelengths:
      determining an average ridge signal level for said set of expected ridge locations in the optical image, and
      determining an average valley signal level for said set of expected valley locations in the optical image,
      calculating a normalized average ridge signal level, said normalization being with respect to one of the determined average ridge signals at one of the wavelengths, and
      calculating a normalized average valley signal level, said normalization being with respect to said one of the determined average valley signals at said one of the wavelengths;
   for each of said different wavelengths, compare said normalized average ridge signal level to said normalized average valley signal level, wherein
   based on the comparison, determining that there is a match between the edge portion of the first image and the edge portion of each of said optical images.

6. The method according to claim 4, comprising:
   determining a set of valley locations in the edge portion of said first image;

based on the valley location in the first image, determining a set of expected valley locations in the optical images acquired at different wavelengths;

based on output signal levels at said expected valley locations in the optical images, for each optical image acquired at different wavelengths:
  determining a first average valley signal level for a first subset of said set of expected valley locations in the optical image,
  determining a second average valley signal level for a second subset of said set of expected valley locations in the optical image; and
  calculating a first normalized average valley signal level for the first average valley signal, said normalization being with respect to the respective one of the determined average valley signals at one of the wavelengths,
  calculating a second normalized average valley signal level for the second average valley signal, said normalization being with respect to the respective one of the determined average valley signals at said one of the wavelengths,
for each of said different wavelengths, comparing the first normalized valley ridge signal level to the second normalized average valley signal level, wherein
based on the comparison, determining that there is a match between the edge portion of the first image and the edge portion of each of said optical images.

7. The method according to claim 4, further comprising:
determining a set of ridge locations in the edge portion of said first image;
based on the ridge location in the first image, determining a set of expected ridge locations in the optical images acquired at different wavelengths;
based on output signal levels at said expected ridge locations in the optical images, for each optical image acquired at different wavelengths:
  determining a first average ridge signal level for a first subset of said set of expected ridge locations in the optical image,
  determining a second average ridge signal level for a second subset of said set of expected ridge locations in the optical image; and
  calculating a first normalized average ridge signal level for the first average ridge signal, said normalization being with respect to the respective one of the determined average ridge signals at one of the wavelengths, and
  calculating a second normalized average ridge signal level for the second average ridge signal, said normalization being with respect to the respective one of the determined average ridge signals at said one of the wavelengths;
for each of said different wavelengths, comparing the first normalized ridge signal level to the second normalized average ridge signal level, wherein
based on the comparison, determining that there is a match between the edge portion of the first image and the edge portion of each of said optical images.

8. The method according to claim 1, wherein said matching comprises:
comparing a pattern in said edge portion of said first image with a pattern in said edge portion of each of at least one optical image, wherein
determining, based on said comparing of patterns, if stitching of the first image with each of the at least one optical image is possible, wherein
when said stitching is successful, determining that there is a match between the edge portion of the first image and the edge portion of each of said at least one optical image.

9. The method according to claim 8, wherein when stitching is successful:
performing said fingerprint authentication procedure based on the combined verification image formed by stitching the first image with one of the at least one optical image, and said plurality of fingerprint enrolment templates, wherein the fingerprint enrolment templates are based on stitched capacitive and optical enrolment images.

10. The method according to claim 1, wherein said matching comprises:
determining first output signal levels from sensing elements of said capacitive fingerprint sensor neighboring the border with the optical sensor configured to acquire the edge portion of the first image;
determining second output signal levels from optical sensor units neighboring said sensing elements of said capacitive fingerprint at the border between the capacitive fingerprint sensor and the optical sensor, said optical sensor units being configured to acquire the edge portion of the optical image,
determining a derivative of said output signal levels across from the edge portion of the first image to the optical image or across from the optical image to the edge portion of the first image, wherein,
when the magnitude of the derivative is less than a threshold value, determining that there is a match between the edge portion of the first image and the edge portion of said optical image.

11. The method according to claim 10, further comprising:
before determining said derivatives, normalizing said first output signal levels with respect to said second output signal levels or normalizing said second output signal levels with respect to said first output signal levels.

12. The method according to claim 1, wherein said capacitive fingerprint sensor is a two-dimensional sensor and said optical sensor is a one-dimensional sensor.

13. Fingerprint sensing system comprising:
a capacitive fingerprint sensor comprising an array of sensing elements for sensing a fingerprint pattern, each sensing element having a sensing structure arranged in a sensing structure plane, said capacitive fingerprint sensor being configured to obtain a capacitive fingerprint image of a first portion of said user's finger,
an optical sensor comprising an array of optical sensor units arranged adjacent to said array of sensing structures in said sensing structure plane, said optical sensor being configured to obtain an optical image of a second portion of said user's finger, said second portion and said first portion being neighboring portions,
said fingerprint sensing system being configured to:
  acquire, using the capacitive fingerprint sensor, a first image of at least a first portion of an object;
  acquire, using the optical fingerprint sensor, a optical image of at least a second portion of said object, said optical image and said first image being representative of neighboring portions of said object;
  providing said first image and said optical image to a control unit configured to:
    match an edge portion of the first image with at least an edge portion of said optical image, the edge portion of the first image and the edge portion of the optical image representing the border between the capacitive fingerprint sensor and the optical sensor, wherein when there is a match,
perform a fingerprint authentication procedure based on at least one of the first image and the optical image, and a plurality of fingerprint enrolment templates.

14. The fingerprint sensing system according to claim 13, wherein said array of sensing elements of said capacitive fingerprint sensor is a two-dimensional array and said array of optical sensor units of said optical sensor is a one-dimensional array arranged along an edge of said array of sensing elements.

15. The fingerprint sensing system according to 13, wherein said array of optical sensor units of said optical sensor is arranged such that the array of sensing elements of said capacitive fingerprint sensor is surrounded by optical sensor units in the sensing structure plane.

16. The fingerprint sensing system according to claim 13, wherein said optical sensor arrangement comprises a light-emitting device configured to illuminate said object, wherein said optical sensor units are configured to detect said optical image in response to said illumination by said light-emitting device.

17. The fingerprint sensing system according to claim 13, wherein said optical sensor is configured to obtain said optical image by reflection spectroscopy or transmission spectroscopy.

18. The fingerprint sensing system according to claim 13, wherein said optical sensor units comprises photo diodes.

19. The fingerprint sensing system according to claim 13, configured to perform the steps claim 1.

20. An electronic device, comprising:
a fingerprint sensing system according to claim 13, and said control unit, wherein said control unit is configured to:
control the capacitive fingerprint sensor to acquire a first image of at least a portion of an object;
control the optical fingerprint sensor to acquire a optical image of at least a portion of said object, said optical image and said first image being representative of neighboring portions of said object;
match an edge portion of the first image with at least an edge portion of said optical image, the edge portion of the first image and the edge portion of the optical image representing the border between the capacitive fingerprint sensor and the optical sensor, wherein when there is a match,
perform a fingerprint authentication procedure based on at least one of the first image and the optical image, and a plurality of fingerprint enrolment templates.

21. The electronic device according to claim 20, wherein the electronic device is a mobile phone.

22. Computer program product comprising a non-transitory computer readable medium having stored thereon computer program means for controlling an electronic device, the electronic device comprising:
a control unit;
a capacitive fingerprint sensor comprising an array of sensing elements for sensing a fingerprint pattern each sensing element having a sensing structure arranged in a sensing structure plane, said capacitive fingerprint sensor being configured to obtain a capacitive fingerprint image of a first portion of said user's finger; and
an optical sensor comprising an array of optical sensor units arranged adjacent to said array of sensing structures in said sensing structure plane, said optical sensor being configured to obtain an optical image of a second portion of said user's finger, said second portion and said first portion being neighboring portions,
wherein the computer program product comprises:
code for controlling the capacitive fingerprint sensor to acquire a first image of at least a portion of an object
code for controlling the optical fingerprint sensor to acquire a optical image of at least a portion of said object, said optical image and said first image being representative of neighboring portions of said object;
code for matching an edge portion of the first image with at least an edge portion of said optical image, the edge portion of the first image and the edge portion of the optical image representing the border between the capacitive fingerprint sensor and the optical sensor, and
code for, when there is a match, performing a fingerprint authentication procedure based on at least one of the first image and the optical image, and a plurality of fingerprint enrolment templates.

\* \* \* \* \*